(No Model.)

W. L. CARTER & O. C. HINMAN.
COMPOSITE MATERIAL AND MANUFACTURE OF SAME.

No. 516,999. Patented Mar. 20, 1894.

Witnesses.
O. W. Harbeson.
F. M. Townsend.

Inventors.
William L. Carter
Orrin C. Hinman
By Hazard & Townsend
Their Attys.

UNITED STATES PATENT OFFICE.

WILLIAM L. CARTER AND ORRIN C. HINMAN, OF LOS ANGELES, CALIFORNIA.

COMPOSITE MATERIAL AND MANUFACTURE OF SAME.

SPECIFICATION forming part of Letters Patent No. 516,999, dated March 20, 1894.

Application filed November 25, 1893. Serial No. 491,957. (No specimens.)

*To all whom it may concern:*

Be it known that we, WILLIAM L. CARTER and ORRIN C. HINMAN, citizens of the United States, and residents of Los Angeles, in the county of Los Angeles and State of California, have invented new and useful Improvements in Composite Materials and Articles Made Therefrom and Methods of Manufacturing the Same, of which the following is a specification.

The object of our invention is to produce a non-corrosive, strong, cheap, impervious and tenacious composition not subject to electrolysis, adapted for use in manufacturing sewer, water and gas pipe, and for molding articles for art designs or for other purposes. Also to produce articles made of such material.

The accompanying drawings represent a section of pipe made in accordance with our invention.

Figure 1:
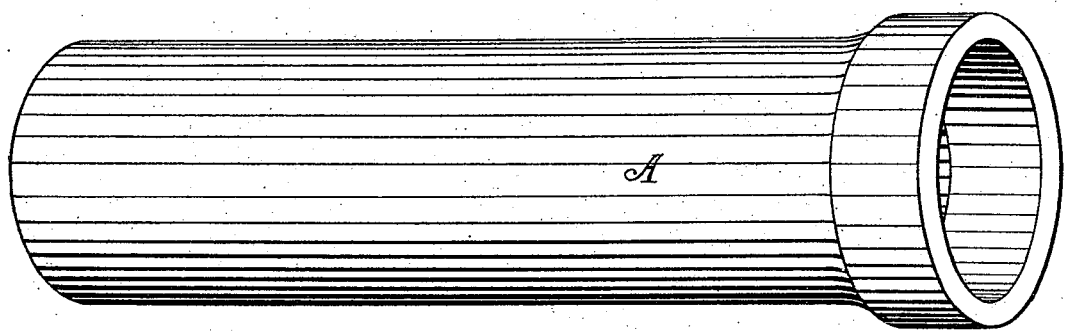
Figure 2:
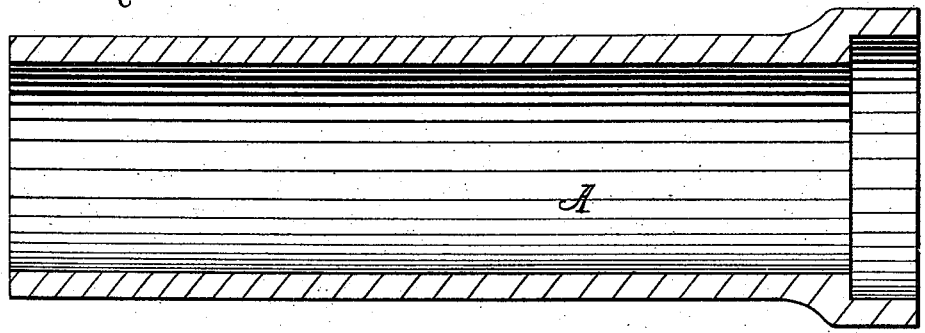

Figure 1 is a perspective side elevation of a section of pipe made according to our invention. Fig. 2 is a longitudinal sectional view of the same.

In the drawings A represents a section of sewer pipe made of our improved composition.

Our invention embraces the composition resulting from the union of sand and sulphur when combined under a heat above the ignition point of sulphur.

In the practical application of our invention we have united under high heat, sand and sulphur combined with some anti-combustive which will act upon the sulphur and permit the heating the sulphur to above the point at which combustion takes place in ordinary commercial sulphur, to thereby cause a more intimate admixture and consequent tenacious adhesion and cohesion of the substances of the mass than is possible where the composition is heated to a degree below that at which the sulphur naturally ignites or burns. The heat we have successfully used is above the melting point of lead.

In applying our invention we have found that by combining under a sulphur fusing heat, of high degree about sixty-five per cent. of sharp sand, twenty-nine per cent. of sulphur and five per cent. of some material which, applied to sulphur has anti-combustive effects, we produce a composite material or composition of great tenacity and non-compressibility. We ordinarily add one per cent. of lamp black or some other coloring mattter to the composition to secure the desired shade in the manufactured article. The anti-combustive which we have successfully employed to enable us to heat the composition to a temperature above the degree at which sulphur will naturally ignite and burn consists of sal-ammoniac, litharge and English whiting in equal proportions, and sufficient to form five per cent. of the whole composition. We have also employed an admixture of brea or asphaltum with the elements hereinbefore mentioned and find that the composition produced is superior in many respects to that where the brea or asphaltum is not used. When we employ brea we use but sixty per cent. of sand and five per cent. brea or asphaltum in combination with the other elements in the proportions above specified.

We find that in order to form a composition which will possess the utmost tenacity, it is necessary to heat the composition to a very high degree. In practice we place the materials together in a vessel and apply heat to fuse the composition and bring it to a very high temperature; we have employed an iron caldron for holding the composition and have heated the caldron to a red heat. We have found that if articles are cast from the composition and before reducing the temperature to a considerable extent, the composition will shrink, thus leaving air holes or an objectionable porosity which reduces the value and utility of the article.

Our improved method of casting articles from compositions consisting of sulphur and sand comprises essentially the following steps: first: placing the sulphur and sand in proper proportions in a vessel, together with an anti-combustive: second: fusing the articles together and raising the temperature of the composition to a degree in excess of that at which sulphur will ignite and burn: third: materially reducing the temperature of the composition (for example, to about 240° Fahrenheit) and fourth: molding the articles from the composition while the same is sufficiently hot for the purpose: viz. at about 240° Fahrenheit. We have found that the best results are secured by placing the sulphur in the bottom of the vessel, then spreading the anti-combustive material on top of the sulphur, then spreading the sand on top of the anti-combustive and then bringing the sulphur to a high temperature by heat applied to the bottom of the vessel. By this means the sulphur is subjected to the most intense heat, and the non combustive material and the sand retain the heat in the sulphur until a very high temperature is reached, after which the sand, sulphur and anti-combustive are incorporated into a homogeneous mass.

In practice, we have found the tensile strength of our improved composition to be over eight hundred pounds to the square inch and we have found that under a pressure of two thousand pounds, an inch cube unsupported at the sides is unchanged in shape. We have also found that our improved composition is not attacked by the most powerful acids and is an electric insulator and that it is not subject to electrolysis. These features render our invention of great importance for use as sewer pipe where certain acids in the sewage attack the ordinary vitrified pipe where the glazing is broken, and also for water and gas pipe, which when made of iron become disintegrated from electrolysis in localities where heavy currents of electricity are used.

While we have found the proportions hereinbefore described to be effective in practical use, our experiments show that a degree of utility above that of ordinary compositions may be secured when proportions substantially different from those specified are used, and therefore we do not limit our claims to any specified proportion of ingredients when such ingredients are heated together to combine sand and sulphur at a temperature in excess of that at which sulphur will ignite when heated with sand or like material without the addition of a non combustive.

Now, having described our invention, what we claim as new, and desire to secure by Letters Patent, is—

1. The composition resulting from the union of sixty-five per cent. sand, twenty-nine per cent. sulphur and five per cent. of some anti-combustive, substantially as set forth.

2. The composition resulting from the union of sand, sulphur, sal-ammoniac, litharge and brea or asphaltum substantially as set forth.

3. The improved method of casting articles from a composite material containing sulphur and sand consisting of the following steps:— first, placing sulphur and sand together with some anti-combustive, in a suitable vessel: second, fusing the material and heating it above the ignition point of sulphur: third, materially reducing the temperature of the composition, and fourth, molding the articles from the cooled composition.

4. The improved method of casting articles from composite material containing sulphur and sand, consisting of, first, placing the sulphur in the bottom of a suitable vessel: second, placing a layer of some anti-combustive over the sulphur: third, placing a layer of sand over the anti-combustive, fourth, bringing the sulphur to a high temperature by means of heat applied to the bottom of the vessel: fifth, incorporating the materials into a homogeneous mass: sixth, materially reducing the temperature of the composition, and seventh casting the articles from the cooled mixture.

5. The process set forth of manufacturing composite material consisting in uniting sulphur and sand at a temperature above the ignition point of sulphur.

W. L. CARTER.
O. C. HINMAN.

Witnesses:
JAMES R. TOWNSEND,
ALFRED I. TOWNSEND.